United States Patent Office 2,715,131
Patented Aug. 9, 1955

2,715,131

PRODUCTION OF NITROGENOUS ANTHRAQUINONE COMPOUNDS

Friedrich Ebel, Mannheim-Feudenheim, and Walter Rupp, Ludwigshafen (Rhine)-Oppau, Germany, assignors to Badische Anilin- & Soda-Fabrik Aktiengesellschaft, Ludwigshafen am Rhein, Bundesrepublik Deutschland No Drawing. Application December 31, 1952,
Serial No. 329,099

Claims priority, application Germany January 22, 1952

12 Claims. (Cl. 260—376)

This invention relates to nitrogenous anthraquinone compounds, in particular nitroso and nitro compounds, and a process of producing same.

We have found that valuable nitrogenous anthraquinones are obtained by treating anthraquinone-1(N).2-isoxazoles having a free 4-position, in the presence of acids, in particular mineral acids, with nitrous acid, the compounds thus obtained being optionally treated with oxidizing agents. The reaction with nitrous acid may be carried out for example by treating a solution or suspension of an anthraquinone-1(N).2-isoxazole of the said kind in a mineral acid with 1 mol of nitrous acid or an excess thereof or also a compound which forms nitrous acid under the reaction conditions, such as alkali nitrite, alkyl nitrite, nitrosyl sulfuric acid or nitrogen sesquioxide. The reaction usually takes place even at room temperature and the red to red-brown color of the anthraquinone-1(N).2-isoxazoles changes to orange to yellow-brown. The separated reaction products can be recrystallized, for example from chlorbenzenes, and constitute well-crystallized unitary compounds the exact constitution of which, however, is not known. Probably they are 4-nitroanthraquinone-1(N).2-isoxazoles of the Formula I or compounds of one of the structures II:

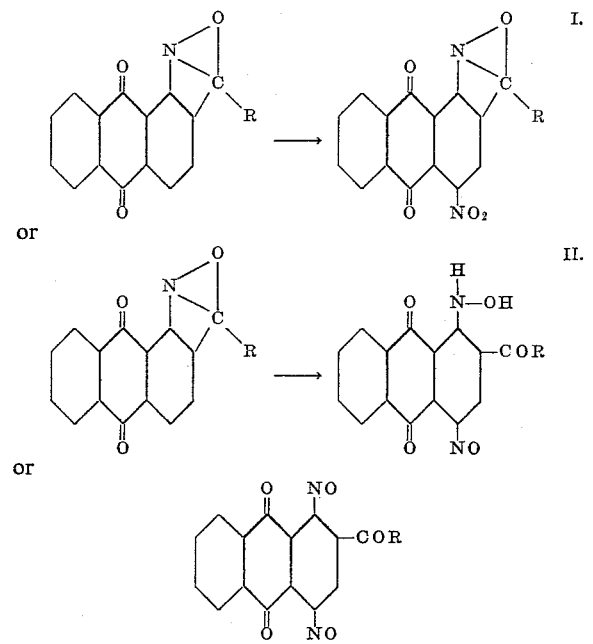

(R being hydrogen or a hydrocarbon radical).

By oxidation of the compounds first formed, in particular with oxidizing agents which act in acid solution, such as hydrogen peroxide, chromic acid, alkali permanganates or nitric acid, 1.4-hydroxylaminonitro- or 1.4-nitroso-nitro-anthraquinones and, finally, 1.4-dinitroanthraquinones are formed which contain in the 2-position an aldehyde, ketone or carboxylic group depending on the initial material employed and on the oxidation conditions. The end products of the process thus have the following constitution:

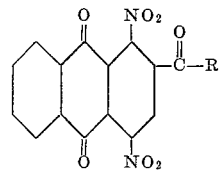

in which R is hydrogen, a hydroxyl group or a hydrocarbon radical. The anthraquinone nucleus may also contain substituents which are stable under the oxidation conditions, such as halogen atoms, alkyl or aryl groups, nitro, alkoxy, carboxylic or acylamino groups.

An advantageous embodiment of the process consists in carrying out the treatment with nitrous acid and with the oxidizing agents in one working operation, for example by following the treatment with nitrous acid, without isolation of the nitrosation product first formed, by the treatment with oxidizing agents, or by allowing the nitrous acid and the oxidizing agent to act simultaneously on the anthraquinone-1(N).2-isoxazole. This method of working is of special advantage when employing nitric acid containing nitrous acid, such as is available technically in the form of so-called yellow nitric acid. However nitric acid which is regarded as practically free from nitrous acid can also be used for the reaction because only a trace of nitrous acid is sufficient to initiate the reaction. The remainder of the nitrous acid required for the reaction is formed during the oxidation and the reaction thus progresses as a chain reaction. There is thereby formed either the primary nitrosation product or the secondary oxidation product depending on the working conditions.

The following examples will further illustrate this invention but the invention is not restricted to these examples. The parts are by weight.

Example 1

20 parts of finely powdered anthraquinone-1(N).2-isoxazole are suspended in 300 parts of 65% yellow nitric acid i. e. nitric acid containing nitrous acid at room temperature. The red-brown isoxazole goes into solution after some time and an orange colored substance crystallizes out soon afterwards. It is further stirred for 6 hours at room temperature and then the deposited compound is filtered off by suction, washed neutral with water and dried. From 7 to 10 parts of a yellow-brown powder are obtained which decomposes above 220° C. According to analysis it has the constitution $C_{15}H_6O_6N_2$ or $C_{15}H_8O_6N_2$ and it is probably 1-nitroso-4-nitroanthraquinone-2-aldehyde or 1-hydroxylamino-4-nitroanthraquinone-2-aldehyde.

5 to 10 parts of 1-nitroanthraquinone-2-carboxylic acid can be precipitated from the mother liquor by dilution with water.

Example 2

80 parts of a nitrosyl sulfuric acid which contains 7.6% of $HNO_2$ is introduced at room temperature while stirring into a suspension of 24 parts of C-methyl anthraquinone-1(N).2-isoxazole in 1000 parts of 50% sulfuric acid and the mixture is stirred for 4 hours. Then the reaction mixture which has become yellow-brown is poured onto ice and the deposited precipitate is filtered off by suction, washed until neutral and dried. There are thus obtained 22 parts of a compound melting at 234° C. which when recrystallized from ortho-dichlorbenzene is obtained in the form of brown needles having the melting point 250° to 251° C. The constitution varies between the values $C_{16}H_8O_5N_2$ and $C_{16}H_{10}O_5N_2$. Probably it is 1.4-dinitroso-2-acetylanthraquinone.

Example 3

30.8 parts of the compound obtained according to Example 2 are introduced into 600 parts of 50% sulfuric acid and there are added to the mixture at room temperature 13.5 parts of chromium-(6)-oxide. The mixture is then heated while stirring at 60° to 70° C. until all the hexavalent chromium has been converted into trivalent chromium. When the reaction is ended, it is diluted with water and the precipitate is filtered off by suction, washed until neutral and dried. 28 parts of a yellow-brown powder are obtained which by recrystallization from trichlorbenzene yields ivory coloured crystals of the melting point 263° C. The new compound is probably 1.4-dinitro-2-acetylanthraquinone.

Example 4

100 parts of C-methyl-anthraquinone-1(N).2-isoxazole are stirred at 20° C. into 200 parts of 65% yellow nitric acid (i. e. nitric acid containing nitrous acid). After temporary dissolution, a yellow compound crystallizes out which is filtered off by suction, washed until neutral and dried. 85 parts (68% of the theoretical amount) of 1.4-dinitro-2-acetylanthraquinone are obtained, which according to its melting point is pure.

Corresponding compounds can be formed in the same way from anthraquinone-1(N).2-isoxazole and C-ethyl-anthraquinone-1(N).2-isoxazole.

Example 5

100 parts of an aqueous paste containing 26.3 parts of C-methylanthraquinone-1(N).2-isoxazole are made into a paste with 2000 parts of 50% nitric acid containing traces of nitrous acid. The color thus changes from red to yellow. It is then heated to 110° C. while stirring, the solid substance thus slowly going into solution with the escape of nitrous gases. After about ¼ hour, a new yellow compound separates out in crystalline form. The whole is stirred for about 1 hour further, and the precipitated compound is filtered off by suction, washed first with 40% nitric acid and then with water until neutral. After drying, 27.4 parts (80% of the calculated amount) of 1.4-dinitroanthraquinone-2-carboxylic acid are obtained in the form of glittering pale yellow crystals having the melting point 265° C.

The new compound forms a characteristic sodium salt $C_{15}H_5O_8N_2Na.2H_2O$ in the form of glittering leaflets which give up their water of crystallization upon heating to 150° C.

Example 6

10 parts of an aqueous paste containing 3 parts of 5-nitro-C-methylanthraquinone-1(N).2-isoxazole are stirred at room temperature with 100 parts of 50% nitric acid containing traces of nitrous acid until a yellow color is formed, this being the case after about 24 hours. The undissolved matter is then filtered off by suction, washed until neutral and the residue exhaustively extracted with a hot 15% aqueous sodium acetate solution. The residue remaining after this treatment is washed until neutral and dried. 2.8 parts of a yellow powder which melts at 257° C. are obtained. By dissolving the compound in 84 parts of dimethylformamide and precipitation with 28 parts of water, it is obtained in the form of a yellow crystal powder which melts at 262° C. with decomposition. According to analysis it is probably 1.4-dinitroso-5-nitro-2-acetylanthraquinone.

Example 7

10 parts of an aqueous paste containing 3 parts of 5-nitro-C-methylanthraquinone-1(N).2-isoxazole are stirred at room temperature with 140 parts of 65% yellow nitric acid, the color thus changing from orange to yellow. It is then heated to boiling until nitrous gases no longer escape and all has gone into solution. Upon cooling and allowing to stand for a long time, fine yellow crystals of 1.4.5-trinitroanthraquinone-2-carboxylic acid having a melting point of 264° to 266° C. separate out. The yield amounts to 2.3 parts, i. e. 60% of the calculated amount. The new compound dissolves in hot aqueous sodium acetate solution giving a pale brown coloration and is precipitated therefrom on cooling as the sodium salt in the form of long, felted crystal hairs.

What we claim is:

1. A compound of the general formula

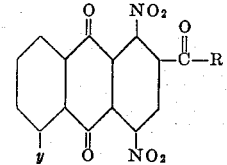

wherein y stands for a member of the class consisting of hydrogen and the nitro group, and R for a member selected from the class consisting of hydrogen, methyl, ethyl and hydroxy groups.

2. The compound

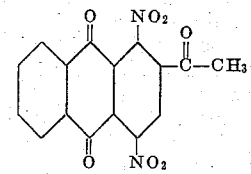

3. The compound

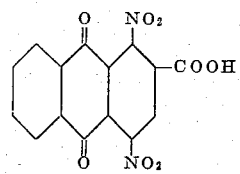

4. The compound

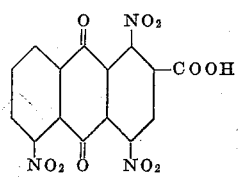

5. A process for the production of a nitrogenous anthraquinone compound which comprises treating an anthraquinone-1(N).2-isoxazole having a free 4-position in the presence of a mineral acid with nitrous acid and treating the first reaction product with an oxidizing agent.

6. A process for the production of a nitrogenous anthraquinone compound which comprises treating an anthraquinone-1(N).2-isoxazole having a free 4-position in the presence of a mineral acid with nitrous acid and treating the first reaction product with an oxidizing agent, both steps being carried out in one operation.

7. A process for the production of a nitrogenous anthraquinone compound which comprises treating an anthraquinone-1(N).2-isoxazole having a free 4-position with a mixture of nitric acid and nitrous acid.

8. A process for the production of a nitrogenous anthraquinone compound which comprises treating an anthraquinone-1(N).2-isoxazole having a free 4-position with a mixture of nitric acid and a small amount of nitrous acid.

9. A process for the production of a nitrogenous anthraquinone compound which comprises treating an anthraquinone-1(N).2-isoxazole having a free 4-position in the presence of a mineral acid with nitrous acid.

10. A nitrogenous anthraquinone compound obtained by treating an anthraquinone-1(N).2-isoxazole having a free 4-position in the presence of a mineral acid with nitrous acid.

11. A nitrogenous anthraquinone compound obtained by treating 5-nitro-C-methylanthraquinone-1(N).2-isoxazole in the presence of a mineral acid with nitrous acid.

12. A nitrogenous anthraquinone compound obtained by treating C-methylanthraquinone-1(N).2-isoxazole in the presence of a mineral acid with nitrous acid.

References Cited in the file of this patent

UNITED STATES PATENTS

| | | |
|---|---|---|
| 1,830,153 | Wilke | Nov. 3, 1931 |
| 1,877,790 | Bayer | Sept. 20, 1932 |
| 1,991,191 | Beard et al. | Feb. 12, 1935 |
| 2,499,003 | Scalera | Feb. 28, 1950 |

FOREIGN PATENTS

| | | |
|---|---|---|
| 771,814 | France | Aug. 6, 1934 |